United States Patent
Jeon et al.

(10) Patent No.: US 12,192,624 B2
(45) Date of Patent: Jan. 7, 2025

(54) IMAGE PROCESSING SYSTEM AND OPERATING METHOD THEREOF

(71) Applicant: SK hynix Inc., Icheon-si (KR)

(72) Inventors: Jae Hwan Jeon, Gyeonggi-do (KR);
Tae Hyun Kim, Gyeonggi-do (KR);
Chang Hun Cho, Gyeonggi-do (KR);
Chang Hee Pyeoun, Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 292 days.

(21) Appl. No.: 17/833,472

(22) Filed: Jun. 6, 2022

(65) Prior Publication Data

US 2023/0262328 A1 Aug. 17, 2023

(30) Foreign Application Priority Data

Jan. 26, 2022 (KR) .......................... 10-2022-0011454

(51) Int. Cl.
*H04N 23/67* (2023.01)
*H04N 23/55* (2023.01)

(52) U.S. Cl.
CPC ............ *H04N 23/67* (2023.01); *H04N 23/55* (2023.01)

(58) Field of Classification Search
CPC .............................. H04N 23/67; H04N 23/55
USPC .......................................................... 348/345
See application file for complete search history.

(56) References Cited

U.S. PATENT DOCUMENTS

| 10,313,579 | B2 | 6/2019 | Kadambala et al. |
| 2019/0335065 | A1* | 10/2019 | Kim ...................... H04N 23/67 |
| 2021/0391363 | A1* | 12/2021 | Ai .......................... H04N 25/70 |

FOREIGN PATENT DOCUMENTS

| JP | 2007003829 | * | 1/2007 |
| KR | 102228456 | B1 | 3/2021 |

* cited by examiner

*Primary Examiner* — Joel W Fosselman
(74) *Attorney, Agent, or Firm* — WILLIAM PARK & ASSOCIATES LTD.

(57) ABSTRACT

An image sensor according to the present disclosure includes a lens configured to receive light, a preliminary operation performer configured to generate position correction information based on a difference between first pixel values, the first pixel values corresponding to pixels of a first micro-lens for the light of a first image received through the lens, and a lens position controller configured to change a position of the lens for a second image on the basis of the position correction information.

18 Claims, 9 Drawing Sheets

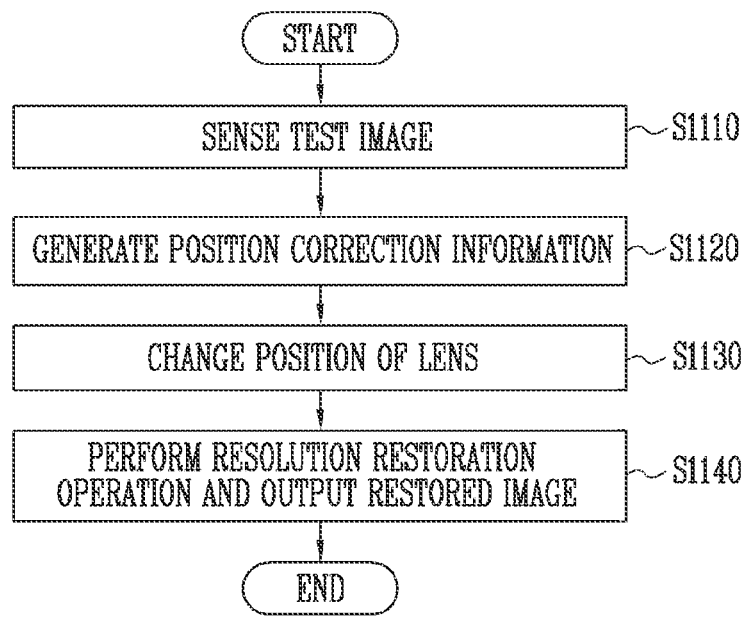
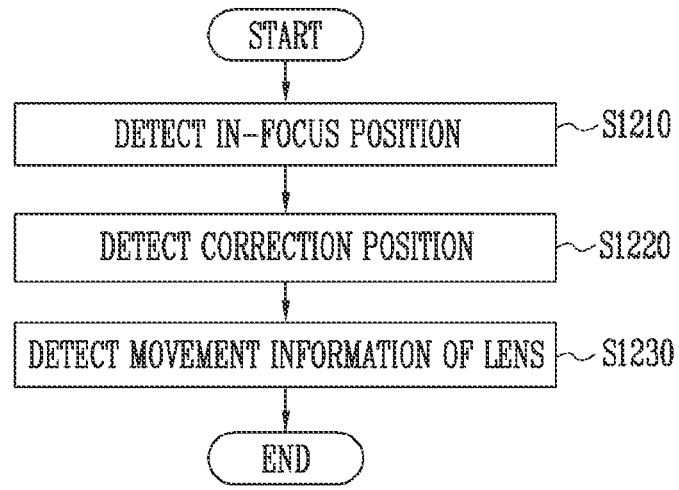

IMAGE PROCESSING SYSTEM AND OPERATING METHOD THEREOF

CROSS-REFERENCE TO RELATED APPLICATION

The present application claims priority under 35 U.S.C. § 119 (a) to Korean patent application number 10-2022-0011454 filed on Jan. 26, 2022, in the Korean Intellectual Property Office, the entire disclosure of which is incorporated by reference herein.

BACKGROUND

1. Technical Field

Various embodiments relate generally to an image processing system, and more particularly, to an image sensor, an image processing system and a method of operating the image processing system.

2. Related Art

An image sensor is a device that captures an image by using a semiconductor that reacts to light. Developments in the computer industry and communication industry have led to increased demand for image sensors for various products such as smartphones, digital cameras, game devices, Internet of Things, robots, security cameras, and medical micro cameras.

An image sensor may be generally classified as a charge coupled device (CCD) image sensor or a complementary metal oxide semiconductor (CMOS) image sensor. A CCD image sensor has less noise and better image quality than a CMOS image sensor. However, a CMOS image sensor has a simple driving method and may be implemented for various scanning methods. In addition, a CMOS image sensor may be integrated with a signal processing circuit on a single chip so that miniaturization of products is easy, power consumption is very low, and manufacturing costs are low since CMOS process technology may be used interchangeably. Accordingly, CMOS image sensing systems have been increasingly used for mobile devices.

SUMMARY

Various embodiments are directed to an image processing system performing an image sensing operation by changing a position of a lens to obtain a maximum difference between pixel values through a preliminary operation, and a method of operating the image processing system.

According to an embodiment, an image sensor may include a lens configured to receive light, a preliminary operation performer configured to generate position correction information based on a difference between first pixel values, the first pixel values corresponding to pixels of a first micro-lens, for the light of a first image received through the lens, and a lens position controller configured to change a position of the lens for a second image on the basis of the position correction information.

According to an embodiment, an image processing system may include a lens, an image sensor, and an image processor. The lens may be configured to receive light and transmit the received light to a plurality of micro-lenses included in an image sensor The image sensor may be configured to generate position correction information about a test image received through the lens according to a phase difference between pixels corresponding to a first micro-lens among the plurality of micro-lenses. The image sensor may be configured to control a position of the lens for a captured image on the basis of the position correction information.

The image processor may be configured to perform a resolution restoration operation on the basis of pixel values of the captured image and output a high-resolution image with restored resolution.

According to an embodiment, a method of operating an image processing system may include sensing a test image by while performing a lens sweep of a lens, generating position correction information for the test image based on a difference between first pixel values corresponding to pixels of a first micro-lens in an image sensor, and changing a position of the lens based on the position correction information.

According to an embodiment, a method of operating an imaging processing system may include sensing a test image while performing a lens sweep of a lens. The method may comprise detecting an in-focus position where first pixels corresponding to a first micro-lens in an image sensor have a same phase and a correction position where a phase difference between the first pixels is the largest.

The method may also comprise generating position correction information for the test image including information about movement distance and direction of the lens movement from the in-focus position to the correction position. The method may include changing the position of the lens to a position corresponding to the position correction information.

BRIEF DESCRIPTION OF THE DRAWINGS

FIG. 3 is a diagram illustrating an example arrangement of a pixel array and micro-lenses according to an embodiment of the present disclosure;

FIG. 4 is a diagram illustrating an example arrangement of a pixel array and micro-lenses according to an embodiment of the present disclosure;

FIG. 5 is a diagram illustrating an example arrangement of a pixel array and micro-lenses according to an embodiment of the present disclosure;

FIG. 6 is a diagram illustrating an example arrangement of a pixel array and micro-lenses according to an embodiment of the present disclosure;

FIG. 11 is a flowchart illustrating an example image sensing operation according to an embodiment of the present disclosure;

FIG. 12 is a flowchart illustrating an example method of performing a preliminary operation according to an embodiment of the present disclosure;

DETAILED DESCRIPTION

Specific structural and/or functional descriptions disclosed in this specification are illustrated only to describe the examples of embodiments in accordance with the concepts provided in this present disclosure. The provided examples of embodiments may be carried out by various forms, but the present disclosure is not limited to the examples of embodiments described in this specification or by the various forms thereof.

Hereinafter, exemplary embodiments of the present disclosure will be described in detail with reference to the accompanying drawings in order for those skilled in the art to be able to readily implement the technical spirit of the present disclosure.

Figure 1:
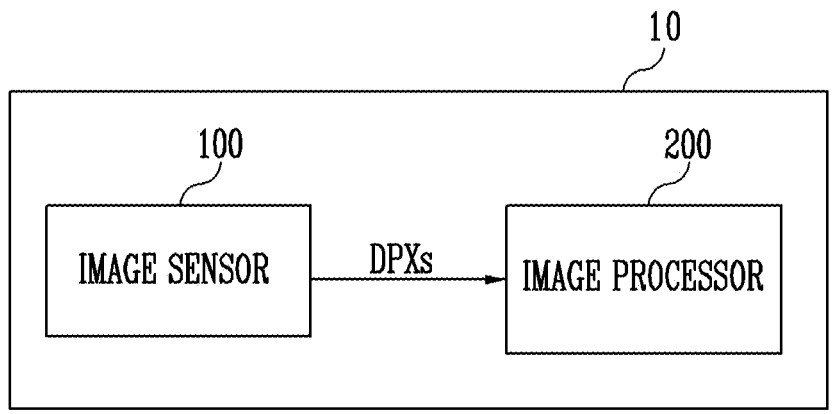
FIG. 1 is a diagram illustrating an example image processing system according to an embodiment of the present disclosure.

FIG. 1 is a diagram illustrating an example image processing system 10 according to an embodiment of the present disclosure.

Referring to FIG. 1, the image processing system 10 may include an image sensor 100 and an image processor 200. The image processing system 10 may obtain an image. In addition, the image processing system 10 may store, display, or output an output image obtained by processing the image to an external device. The image processing system 10 may output the output image to a host according to a request of the host.

According to an embodiment, the image processing system 10 may be realized in the form of a packaged module, a part, or the like, which may include hardware circuitry and/or executable instructions such as, for example, software instructions and/or firmware instructions. The image processing system 10 may be implemented as a part of an electronic device or a separate unit that is used in conjunction with an electronic device. For example, the electronic device may be a digital camera, a mobile device, a smart phone, a personal computer (PC), a tablet PC, a notebook, a personal digital assistant (PDA), an enterprise digital assistant (EDA), a portable multimedia player (PMP), a wearable device, a black box, a robot, an autonomous vehicle, or the like.

The electronic device may also be, for example, an imaging device, a camcorder, a closed-circuit television (CCTV), a webcam, a security camera, an industrial vision camera, an in-vehicle vision camera, a set-top box, a game console, an electronic dictionary, an e-book reader, a desktop computer, a server, an MP3 player, a smart medical device, a television, a digital video disk (DVD) player, an audio, a refrigerator, an air conditioner, a cleaner, an oven, a microwave oven, a washing machine, an air purifier, a smart mirror, a smart window, an electronic key, an electronic picture frame, a digital billboard, a security control panel, and the like. The wearable device may be a smart watch, a ring, a bracelet, an anklet, a necklace, glasses, a contact lens, a head-mounted-device (HMD), a skin pad, a tattoo, a biological transplant type circuit, or the like.

Figure 8:
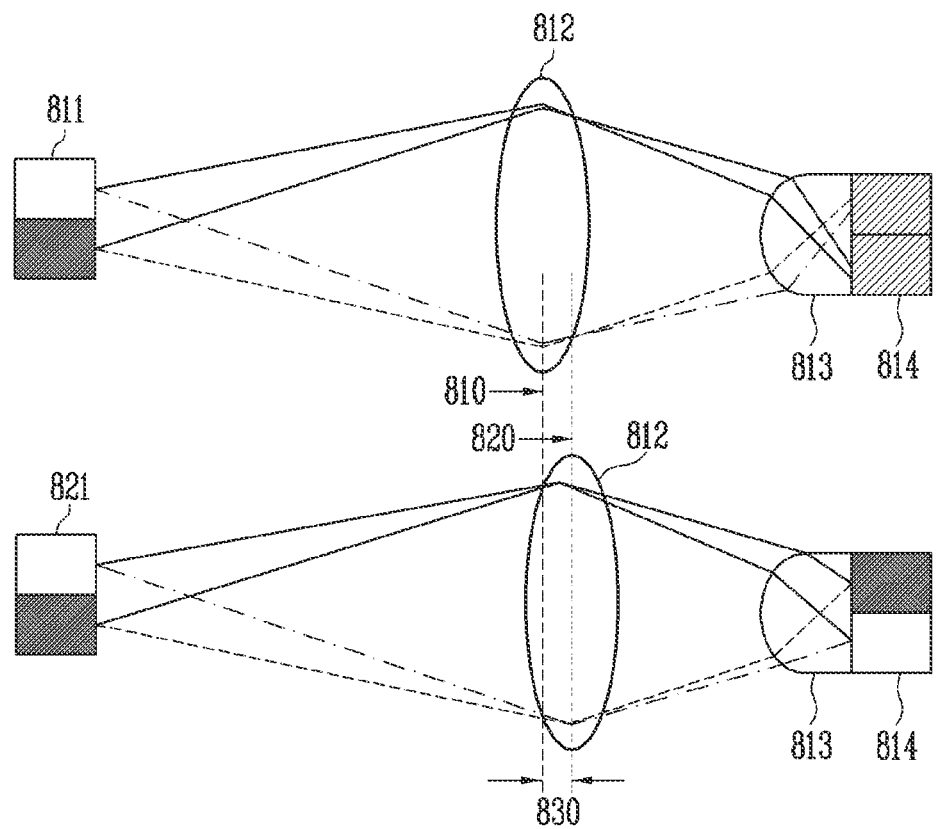
FIG. 8 is a diagram illustrating an example method of operating a preliminary operation according to an embodiment of the present disclosure.

The image sensor 100 may be implemented as, for example, a charge coupled device (CCD) image sensor, a complementary metal oxide semiconductor (CMOS) image sensor, or any other type of image sensor. The image sensor 100 may generate image data for an object 811 (FIG. 8) that is input (or captured) through a lens 812 (FIG. 8). For example, light emitted by the object and/or reflected by the object 811 may be received by the lens 812. The lens 812 may include at least one lens forming an optical system. According to an embodiment of the present disclosure, the lens 812 may be included in the image sensor 100, or provided outside the image sensor 100.

The image sensor 100 may include a plurality of imaging elements for generating a representation (or captured image) of the object. The imaging elements may use, for example, CCD technology, CMOS technology, or other forms of imaging technology. The image sensor 100 may generate a plurality of digital pixel values DPXs corresponding to the plurality of pixels for the captured image. The plurality of digital pixel values DPXs generated by the image sensor 100 may be transferred to the image processor 200. That is, the image sensor 100 may generate the plurality of digital pixel values DPXs corresponding to a photograph or a single frame of a video. For ease of description, the term "pixel" may refer to the imaging element or an element of the captured image.

The image processor 200 may process the pixel data received from the image sensor 100 to generate processed image data that may have improved image quality, and may output the processed image data. The processing may be electronic image stabilization (EIS), interpolation, color tone correction, image quality correction, size adjustment, or the like.

As shown in FIG. 1, the image processor 200 may be implemented independently of the image sensor 100. For example, the image sensor 100 and the image processor 200 may be implemented as individual chips that are in one package, such as a multi-chip package comprising the chip for the image sensor 100 and the chip for the image processor 200. In another embodiment of the present disclosure, the image processor 200 and the image sensor 100 may be in a single chip. Various embodiments of the disclosure may also have each of the image sensor 100 and/or the image processor 200 as multiple chips.

According to an embodiment, the image processing system 10 may further include memory. The memory may be implemented as, for example, a nonvolatile memory element. For example, the memory may be one of various memory elements such as a read only memory (ROM) that may read only data, one time programmable (OTP) memory that may be written only once, an erasable and programmable ROM (EPROM) that may erase and write stored data, a NAND flash memory, and a NOR flash memory.

Figure 2:
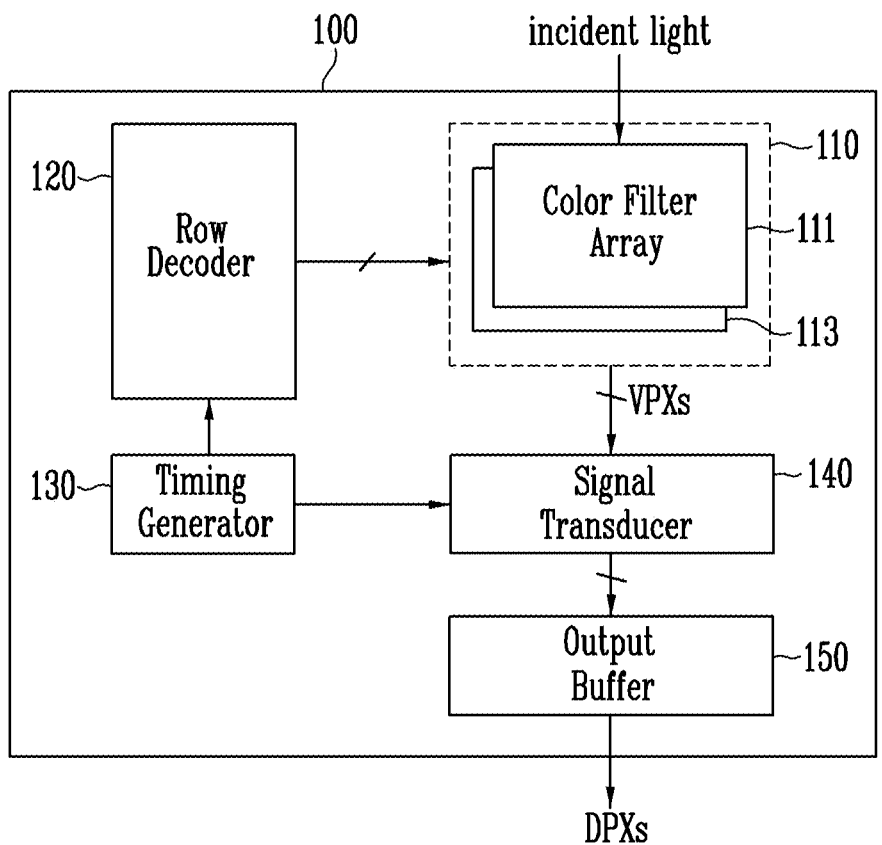
FIG. 2 is a diagram illustrating an example image sensor of FIG. 1 according to an embodiment of the present disclosure.

FIG. 2 is a diagram illustrating the image sensor 100 of FIG. 1 according to an embodiment of the present disclosure.

Referring to FIG. 2, the image sensor 100 may include a pixel array 110, a row decoder 120, a timing generator 130, and a signal transducer 140.

The pixel array 110 may include a color filter array 111 and a photoelectric conversion layer 113 according to an embodiment. The photoelectric conversion layer 113 may be formed, for example, under the color filter array 111 and include a plurality of photoelectric conversion elements corresponding to respective pixels of the color filter array 111. The pixel array 110 may include a plurality of pixels for outputting color information included in incident light. Each of the plurality of pixels may output a pixel signal corresponding to the incident light passing through the corresponding color filter array 111.

The color filter array 111 may include color filters that pass only a specific wavelength (for example, red, blue, or green) of the light incident upon each pixel. In the present disclosure, a color filter may be expressed as a color channel. The color filter array 111 may allow pixel data of each pixel to indicate a value corresponding to an intensity of the light of the specific wavelength.

Specifically, each of the plurality of pixels may accumulate photocharges that are generated according to the incident light, and may generate a pixel signal that corresponds to the accumulated photocharges. Each of the pixels may include a photoelectric conversion element (for example, a photo diode, a photo transistor, a photogate, a pinned photo diode, etc.) to convert an optical signal into an electrical signal, and at least one transistor may be provided to process the electrical signal.

The pixel array 110 may include the plurality of pixels arranged in a row direction and a column direction. The pixel array 110 may generate a plurality of pixel signals VPXs for each row. The plurality of pixel signals VPXs may be, for example, analog pixel signals.

The row decoder 120 may select one row among a plurality of rows in which the plurality of pixels are arranged in the pixel array 110 in response to an address and control signals output from the timing generator 130.

The signal transducer 140 may convert the plurality of analog pixel signals VPXs into a plurality of digital pixel values DPXs. The plurality of digital pixel values DPXs may be output in various patterns. The signal transducer 140 may perform, for example, correlated double sampling (CDS) on signals output from the pixel array 110 in response to the control signals output from the timing generator 130, and may perform analog-to-digital conversion on the signals on which the CDS is performed to output digital signals. Each of the digital signals may correspond to the intensity of the wavelengths of the incident light that passes through the corresponding color filter array 111.

The signal transducer 140 may include a CDS block (not shown) and an analog-to-digital converter (ADC) block (not shown). The CDS block may sequentially sample and hold a reference signal and an image signal set provided to each of a plurality of column lines included in the pixel array 110. That is, the CDS block may sample and maintain levels of a reference signal and an image signal corresponding to each of the columns. The ADC block may output pixel data obtained by converting a CDS signal for each column output from the CDS block into a digital signal. To output the pixel data, the ADC block may include a comparator and a counter corresponding to each column.

In addition, the image sensor 100 according to an embodiment of the present disclosure may further include an output buffer 150. The output buffer 150 may be implemented as a plurality of buffers that store the digital signals output from the signal transducer 140. More specifically, the output buffer 150 may latch and output the pixel data of each column provided from the signal transducer 140. The output buffer 150 may temporarily store the pixel data output from the signal transducer 140, and may sequentially output the pixel. According to another embodiment of the present disclosure, the image sensor 100 may not provide the output buffer 150. Accordingly, an embodiment of the image sensor 100 may output the digital pixel values DPX directly from the signal transducer 140 without use of the output buffer 150.

Figures 3, 4:
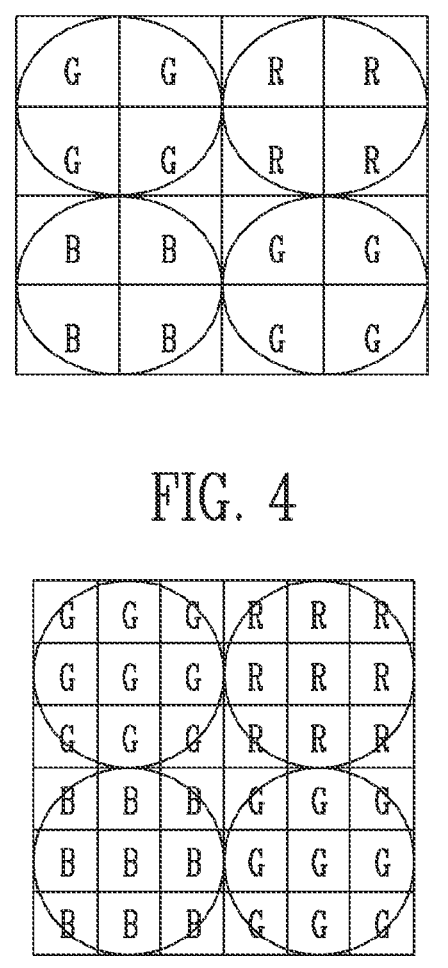

FIG. 3 is a diagram illustrating an example arrangement of a pixel array and micro-lenses according to an embodiment of the present disclosure.

Referring to FIG. 3, an example is shown in which one micro-lens corresponds to four adjacent pixels for detecting the same color. Referring to FIG. 3, four green pixels may correspond to one micro-lens. Four adjacent red pixels or four adjacent blue pixels may also correspond to one micro-lens.

As shown in FIG. 3, sixteen pixels may correspond to four micro-lenses. A micro-lens may correspond to a group of four pixels that are configured to detect the same color. For example, when red pixels correspond to one micro-lens, light from the micro-lens may be made incident upon the red pixels and pixel values of the red pixels may be processed to obtain phase information.

Four blue pixels or four green pixels may also correspond to one micro-lens. In the same manner, the four blue pixels or the four green pixels may also be processed to obtain the phase information.

However, embodiments of the present disclosure are not limited to the example in which one micro-lens corresponds to four pixels. That is, the number of pixels that correspond to one micro-lens may vary. Accordingly, a micro-lens may be said to correspond to a group of pixels that detect the same color. Pixels that detect a color may be referred to as pixels that have the same color or pixels that are of the same color.

Accordingly, the image sensor 100 according to an embodiment of the present disclosure may generate pixel values of all pixels, which may be used to get phase information for the pixels.

FIG. 4 is a diagram illustrating an example arrangement of a pixel array and micro-lenses according to an embodiment of the present disclosure.

Referring to FIG. 4, nine adjacent pixels that have the same color may correspond to one micro-lens. Each of the pixel values of the pixels that correspond to one micro-lens may be used to determine phase information for those pixels.

According to the present disclosure, an image sensor that includes a pixel array in which one micro-lens corresponds to nine pixels may be used. According to an embodiment of the present disclosure, the number of pixels corresponding to one micro-lens need not be limited to a specific number. The number of pixels in a micro-lens may be design based on requirements such as, for example, image clarity.

Figures 5, 6:
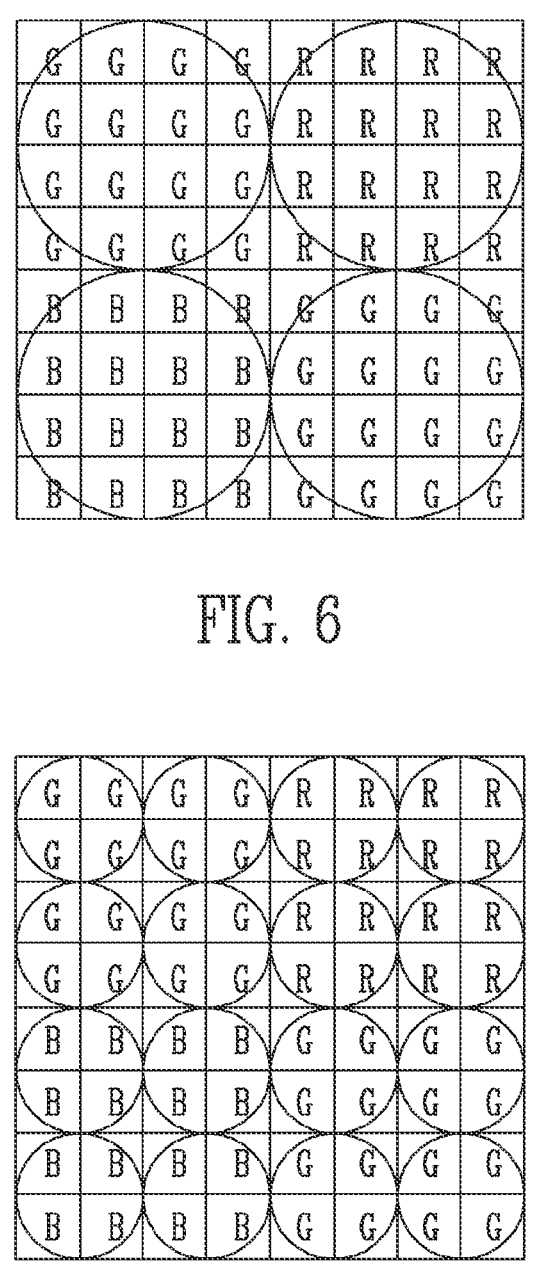

FIG. 5 is a diagram illustrating an example arrangement of a pixel array and micro-lenses according to an embodiment of the present disclosure.

As shown in FIG. 5, sixty four pixels may correspond to four micro-lenses where each micro-lens may correspond to sixteen pixels. Pixels that correspond to one micro-lens may be adjacent to each other and have the same color.

FIGS. 3, 4, and 5 show only examples, and the number of pixels that correspond to one micro-lens may not be limited thereto. The pixels that correspond to a micro-lens are grouped together and may be said to be adjacent to each other (or adjacent pixels) although two pixels in a micro-lens may not be directly adjacent to each other. For example, in FIG. 4, while all nine pixels of a micro-lens may be said to be adjacent pixels, the pixels in the top row are not directly adjacent to the pixels in the bottom row. Additionally, pixels that correspond to a micro-lens may be said to be the pixels of the micro-lens.

FIG. 6 is a diagram illustrating an example arrangement of a pixel array and micro-lenses according to an embodiment of the present disclosure.

Referring to FIG. 6, one micro-lens may correspond to four pixels. Additionally, in FIG. 6, four micro-lenses adjacent to each other may all correspond to pixels that have the same color.

According to an embodiment, pixels that correspond to one micro-lens may have the same color. Also, as shown in FIG. 6, four neighboring micro-lenses may all have pixels of the same color.

According to an embodiment (shown in FIG. 8), the pixel array may be located under the micro-lens (e.g. 813). However, various embodiments of the disclosure are not limited thereto. One or more objects may exist between the micro-lens 813 and the pixel array.

Figure 7:
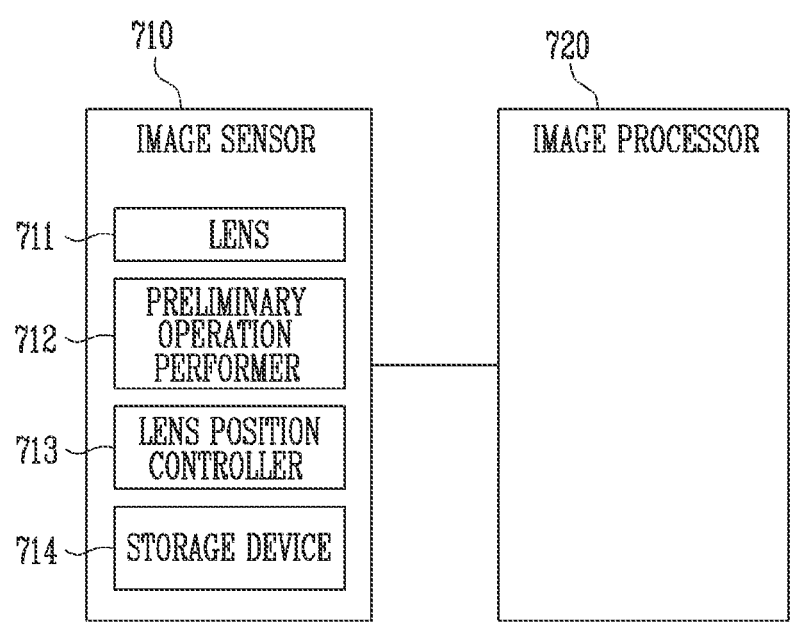
FIG. 7 is a block diagram illustrating an example image processing system according to an embodiment of the present disclosure.

FIG. 7 is a block diagram illustrating an example image processing system according to an embodiment of the present disclosure, FIG. 7 illustrates an example image processing system including components, and may show one embodiment of the image processing system 10 shown in FIG. 1.

Referring to FIG. 7, an image sensor 710 may generate image data, and an image processor 720 may receive the image data and generate an output image. The image sensor 710 may include a lens 711, a preliminary operation performer 712, a lens position controller 713, and a storage device 714.

The lens 711 may collect light received from the outside the image sensor 710. According to an embodiment of the present disclosure, the lens 711 may be an optical lens. The lens 711 may transfer the received light to a plurality of micro-lenses included in the image sensor 710.

As shown in FIG. 7, in one embodiment the image sensor 710 may include the lens 711. However, in another embodiment, the lens 711 may be located outside the image sensor 710.

The preliminary operation performer 712 may generate position correction information based on a difference between first pixel values corresponding to a first micro-lens among a plurality of pixel values with respect to a first image received through the lens 711. According to an embodiment, the first micro-lens may be one of the plurality of micro-lenses included in the image sensor 710. The preliminary operation performer 712 may generate position correction information on the basis of first pixel values of a plurality of pixels that correspond to a micro-cell, and have the same color and are adjacent to each other.

According to an embodiment, the first image may be, for example, a pre-selected test image. The test image may be provided to test the image sensor 710.

The preliminary operation performer 712 may detect an in-focus position of the lens 711, when, for example, the first pixel values for a micro-cell for the first image have the same value. The preliminary operation performer 712 may detect a correction position of the lens 711 when, for example, the difference between the first pixel values for the first image is the largest.

According to another embodiment, the preliminary operation performer 712 may generate position correction information for the test image received through the lens 711 based on a phase difference between pixels for the first micro-lens among the plurality of micro-lenses. The preliminary operation performer 712 may detect an in-focus position of the lens 711 when, for example, the first pixels for the test image have the same phase. The preliminary operation performer 712 may detect a correction position of the lens 711 when, for example, a phase difference between the first pixels for the test image is the largest.

The preliminary operation performer 712 may generate position correction information for the first image that includes movement information of the lens 711 that has moved from the in-focus position to the correction position. According to an embodiment of the present disclosure, the preliminary operation performer 712 may detect the correction position based on a difference between a maximum value and a minimum value among the first pixel values. According to another embodiment, the preliminary operation performer 712 may detect a correction position based on pixel values of pixels located in a diagonal direction among the first pixel values.

The lens position controller 713 may change the position of the lens 711 with respect to a second image on the basis of the position correction information. The lens position controller 713 may move the lens 711 to a position corresponding to the movement information from an in-focus position of the second image on the basis of the position correction information about the first image.

According to an embodiment, the second image may be a captured image. The captured image may be an actual image of an object sensed, or captured, by the image sensor 710. The lens position controller 713 may move the lens 711 to the in-focus position of the second image. The lens position controller 713 may move the position of the lens 711 to a position corresponding to the position correction information in order to obtain a restorable image with high resolution.

According to an embodiment of the present disclosure, the preliminary operation performer 712 may generate edge correction information on the basis of second pixel values corresponding to a second micro-lens, of the plurality of micro-lenses, configured to receive light from an edge of the first image among. This may also be phrased as having the second micro-lens located at an edge of the first image. The lens position controller 713 may additionally move the lens 711, which has moved to the position corresponding to the movement information, on the basis of the edge correction information.

According to an embodiment, an operation of moving the lens 711 may be referred to as a "performing a lens sweep" or a "lens sweep operation." According to an embodiment, the image sensor 710 may sense, or capture, the test image while performing a lens sweep of the lens 711. The lens 711 may be moved, for example, within a predetermined range. The lens 711 may be lens swept to a position that is not an in-focus position. The image sensor 710 may obtain pixel values by changing the position of the lens 711. The pixel values of the image sensor 710 may be changed in response to the movement of the lens 711. The image sensor 710 may detect an in-focus position and a correction position on the basis of the pixel values obtained by performing a lens sweep of the lens 711.

The image sensor 710 may store the position correction information of the lens 711 in the storage device 714. The storage device 714 may comprise non-volatile and/or volatile memory devices. The image sensor 710 may update the position correction information stored in the storage device 714. The image sensor 710 may update the position correction information on the basis of a result of performing an image sensing/capture operation and a restoration operation of the captured image.

The image processor 720 may perform a resolution restoration operation on the basis of the pixel values of the captured image. The image processor 720 may output a high-resolution image with restored resolution. According to an embodiment, when the position of the lens 711 corresponds to the in-focus position, there may no phase difference between the pixels, which may make it difficult to perform a high-resolution image restoration operation. When the lens 711 is moved to a position corresponding to the position correction information with respect to the test image, the image processor 720 may be able to perform the high-resolution image restoration operation since a difference between the pixel values obtained from the image sensor 710 may be the largest.

FIG. 8 is a diagram illustrating an example method of operating a preliminary operation according to an embodiment of the present disclosure.

Referring to FIG. 8, there is shown an in-focus position 810 of a lens 812 with respect to a test image and a correction position 820 of the lens 812. In FIG. 8, when a position of the lens corresponds to the in-focus position 810, it may be difficult to perform a high-resolution image restoration operation due to small or no phase difference between the pixels. Image restoration may not be performed when, for example, the phase difference between pixels is less than a threshold value. In various embodiments, the threshold value may be a pre-determined default value that may be fixed. In various embodiments, the threshold value may be a pre-determined default value that may be adjustable.

According to an embodiment, a high-resolution image restoration operation may use phase difference between the pixels. Since there are a plurality of pixels corresponding to one micro-lens, the pixels at the in-focus position 810 may have the same phase. Accordingly, an image sensor may detect a correction position where the phase difference between the pixels is the largest by performing a lens sweep. In other words, the image sensor 710 may detect the correction position where a phase difference between the pixels is the largest on the basis of pixel values obtained by moving the lens within a predetermined range (performing a lens sweep). The phase difference may be, for example, a phase difference between two pixels.

In connection with the in-focus position 810, light reflected from an object 811 may be incident on the lens 812. The lens 812 may transmit light to a micro-lens 813. The light may then be incident upon pixels 814 in a pixel array.

At the in-focus position 810, different images of the object 811 may be combined on the pixels 814. Accordingly, it may be difficult to perform a restoration operation of the object 811 based on pixel values of the pixels 814.

According to an embodiment, the image sensor 710 may sense the test image by performing a lens sweep. At the correction position 820, light reflected from an object 821 may be incident on the micro-lens 813 through the lens 812. The light may be incident upon pixels 814 in a pixel array.

At the correction position 820, different images of the object 821 may be separated on the pixels 814. Accordingly, since the pixels 814 may have different pixel values, the image processor 720 may be able to perform a high-resolution image restoration operation.

According to an embodiment, the image sensor 710 may detect the in-focus position 810 and the correction position 820 while performing the lens sweep. A position 810 of the lens 812 where pixel values corresponding to the micro-lens 813 are the same may be the in-focus position 810. A position of the lens 812 where the difference between the pixel values corresponding to the micro-lens 813 is the largest may be the correction position 820.

According to an embodiment, the image sensor 710 may generate position correction information indicating a position difference 830 of the lens 812 corresponding to the in-focus position 810 and the correction position 820. The position correction information may include movement information of the lens 812 from the in-focus position 810 to the correction position 820. According to another embodiment, the position correction information may include information about movement distance and movement direction the lens from the in-focus position 810 to the correction position 820.

According to another embodiment, the image sensor 710 may sense a test image by sweeping the positions of the micro-lens 813 and the pixels 814 corresponding to the micro-lens 813 without performing a lens sweep. The image sensor 710 may generate position correction information that indicates changes in the positions of the micro-lens 813 and the pixels 814. This may comprise moving the micro-lens 813 and the pixels 814 rather than the lens 812.

According to another embodiment, the image sensor 710 may sense the test image while sweeping the positions of the pixels 814 and the lens 812. The image sensor 710 may then generate position correction information that indicates changes in the positions of the lens 812 and the pixels 813. This may comprise moving the lens 812 and the pixels 814 without moving the micro-lens 814. Generally any one or more of the lens 812, micro-lens 813, or pixels 814 may be moved to determine the correction position.

Figure 9:
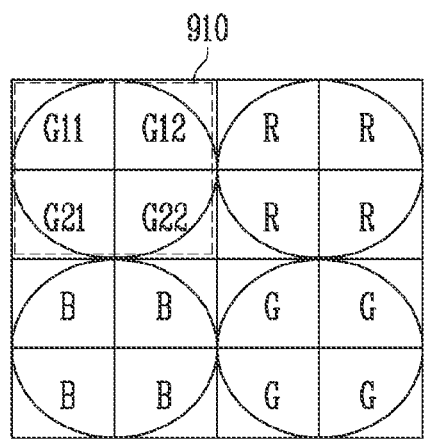
FIG. 9 is a diagram illustrating an example method of detecting an in-focus position and a correction position according to an embodiment of the present disclosure.

FIG. 9 is a diagram illustrating an example method of detecting an in-focus position and a correction position according to an embodiment of the present disclosure.

Referring to FIG. 9, one micro-lens may correspond to four pixels 910. The four pixels 910 may have the same color and be adjacent to each other. In FIG. 9, the preliminary operation performer 712 may generate position correction information on the basis of pixel values of green pixels G11, G12, G21, and G22.

The preliminary operation performer 712 may calculate a difference between a maximum value and a minimum value among the four pixels 910. According to an embodiment, the preliminary operation performer 712 may perform a lens sweep of the lens 711 to detect a correction position of the lens 711 where the difference between the maximum value and the minimum value among the four pixels 910 is the largest. For example, the lens sweep may result in finding that the green pixel G11 may have the maximum value and the green pixel G21 may have the minimum value among the four pixels 910. Accordingly, the preliminary operation performer 712 may detect the position of the lens 711 where the difference between G11 and G21 is the largest as the correction position.

According to another embodiment, the preliminary operation performer 712 may calculate a pixel value difference between pixels located in a diagonal direction of the four pixels 910. The preliminary operation performer 712 may calculate a pixel value difference between G11 and G22 and a pixel value difference between G12 and G21 by lens sweeping the lens 711. The preliminary operation performer 712 may calculate an average value between the two pixel value differences. The preliminary operation performer 712 may detect the correction position of the lens 711 on the basis of the pixel values of the pixels located in the diagonal direction among pixels corresponding to one micro-lens.

FIG. 9 illustrates only the case where one micro-lens corresponds to the four pixels 910. However, the present disclosure is not limited thereto. A micro-lens may comprise, for example, nine pixels, sixteen pixels, or another number of pixels.

Figure 10:
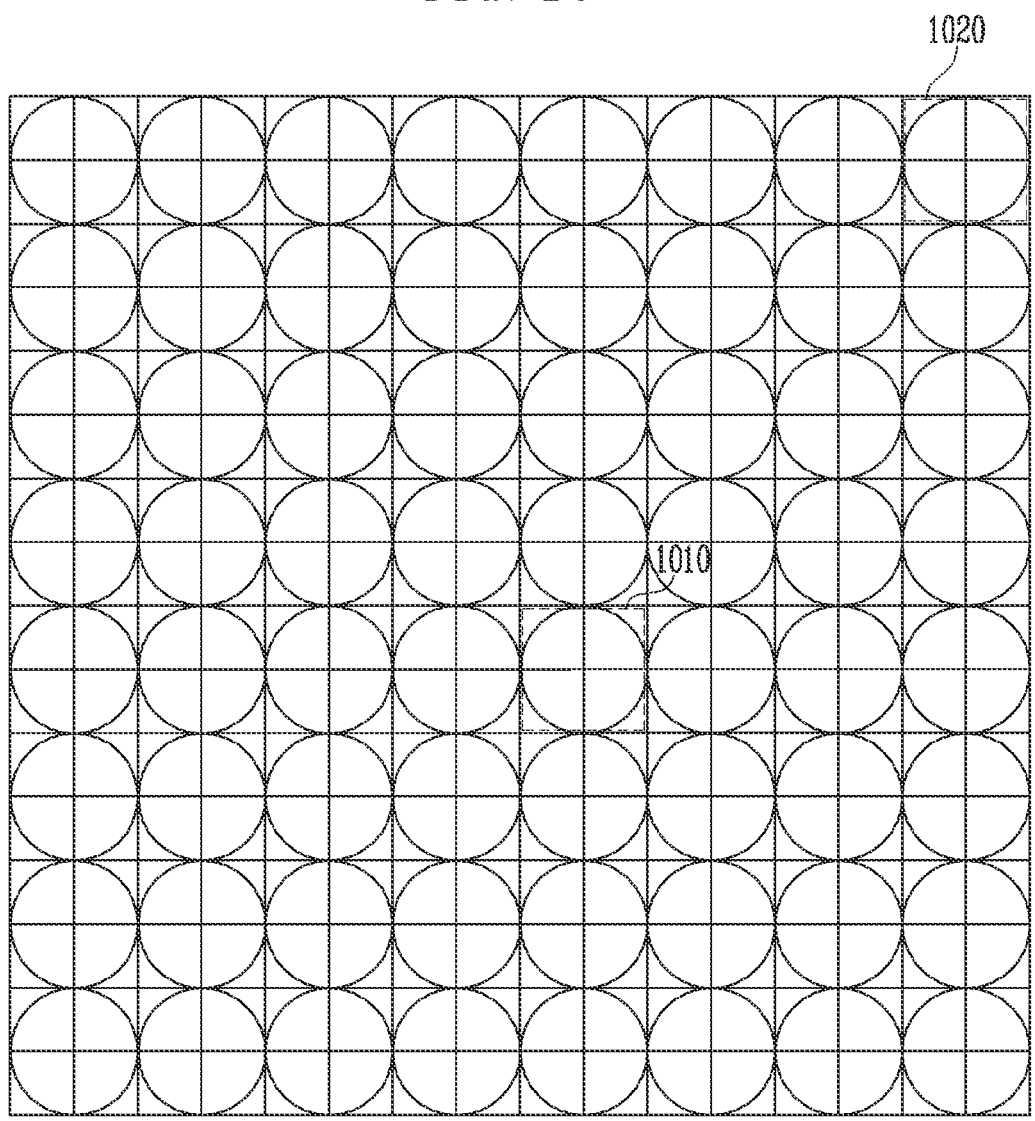
FIG. 10 is a diagram illustrating an example method of additionally moving a lens using a second micro-lens position for an image according to an embodiment of the present disclosure.

FIG. 10 is a diagram illustrating an example method of additionally moving a lens according to a position within an image.

Referring to FIG. 10, position correction information corresponding to a center 1010 of an image may be different from position correction information corresponding to an edge 1020 of the image. Since the lens may have a circular shape, the lens 711 may be moved more based on the position correction information corresponding to the edge 1020 of the the position correction information image than with corresponding to the center 1010 of the image.

According to an embodiment of the present disclosure, the preliminary operation performer 712 may generate edge correction information on the basis of second pixel values corresponding to a second micro-lens located at an edge of a first image, among the plurality of micro-lenses. The lens position controller 713 may additionally move the lens 711, which has moved to the position corresponding to the movement information, on the basis of the edge correction information.

For example, the position of the lens 711 may be changed when an image sensing operation is performed based on the position correction information corresponding to the first image, which may be a test image. The position correction information may correspond to the center 1010 of the image or the edge 1020 of the image. When the image sensing operation is performed based on the position correction information corresponding to the center 1010 of the image, the pixel value difference between the pixels at the edge 1020 of the image may not be the largest.

According to an embodiment, the preliminary operation performer 712 may generate edge correction information, which may be a position correction information corresponding to the edge 1020 of the test image. The lens position controller 713 may additionally move the position of the lens 711 to be changed based on, for example, the position correction information on the basis of the edge correction information.

According to another embodiment, the preliminary operation performer 712 may store position correction information corresponding to different micro-lenses to, for example, the storage device 714. The stored position correction information may correspond to the center 1010 of the test image, or the edge 1020 of the test image. The preliminary operation performer 712 may change the position of the lens 711 from the in-focus position during the image sensing operation by using, for example, an average value of a plurality of stored pieces of position correction information.

FIG. 11 is a flowchart illustrating an example image sensing operation according to an embodiment of the present disclosure.

Referring to FIG. 11, an image processing system similar to, for example, the image processing system of FIG. 7, may generate position correction information by sensing a test image, and may obtain pixel values by changing a position of the lens 711 during an image sensing operation. The image processing system 710 may perform a high-resolution image restoration operation using the obtained pixel values.

At step S1110, the image sensor 710 may sense a test image while performing a lens sweep. The image sensor 710 may sense the test image by changing the position of the lens 711. When the position of the lens 711 is changed, the focus of the light collected by a pixel array of the image sensor 710 may be changed.

At step S1120, the preliminary operation performer 712 may perform the lens sweep operation to generate position correction information for the test image. This information may be used to determine a maximum difference for first pixel values corresponding to a first micro-lens among a plurality of micro-lenses included in the image sensor.

Accordingly, the preliminary operation performer 712 may generate the position correction information based on the difference between the first pixel values corresponding to the first micro-lens among a plurality of pixel values with respect to a first image received through the lens 711. According to an embodiment, the first micro-lens may be one of the plurality of micro-lenses included in the image sensor 710. The preliminary operation performer 712 may generate the position correction information on the basis of the first pixel values of a plurality of pixels that have the same color and are adjacent to each other.

According to an embodiment, the first image may be the test image. The test image may be provided to test the image sensor 710.

At step S1130, a lens position controller 713 may change the position of the lens 711 on the basis of the position correction information during an image sensing operation. When the image sensing operation is performed, the lens 711 may be moved to an in-focus position with respect to a captured image. The resolution of pixel values of an image obtained at the in-focus position may be reduced during an image restoration operation. The lens position controller 713 may change the position of the lens 711 on the basis of the position correction information generated by sensing the test image. The lens position controller 713 may move the lens 711 to a position corresponding to the position correction information of the test image. Light may be collected through the lens 711 whose position has been changed, and may be transmitted to pixels such as, for example, the pixels 814. Since pixel values of an image generated by the image sensor 710 have different phases, high resolution may be maintained during an image restoration operation.

At step S1140, an image processor 720 may restore the resolution of the captured image on the basis of the pixel values of the captured image and may output the restored image. The image processor 720 may perform the resolution restoration operation on the basis of the pixel values of the captured image. The image processor 720 may output a high-resolution image with restored resolution.

According to an embodiment, since pixel values of all pixels include phase information, the resolution of the sensed image may be maintained even when a resolution restoration operation is performed.

FIG. 12 is a flowchart illustrating an example method of performing a preliminary operation according to an embodiment of the present disclosure.

Referring to FIG. 12, the preliminary operation performer 712 may generate position correction information of a lens 711 by sensing a test image.

At step S1210, the preliminary operation performer 712 may detect an in-focus position of the lens where first pixel values of pixels that have the same color and are adjacent to each other with respect to the test image have the same value. According to another embodiment, the preliminary operation performer 712 may generate position correction information about the test image received through the lens 711 based on a phase difference of pixels corresponding to a first micro-lens among a plurality of micro-lenses. The preliminary operation performer 712 may detect an in-focus position of the lens 711 where the first pixels with respect to the test image have the same phase.

At step S1220, the preliminary operation performer may detect a correction position that is the position of the lens where the difference between the first pixel values with respect to the test image is the largest. According to another embodiment, the preliminary operation performer may detect the correction position that is the position of the lens where the phase difference between the first pixels for the test image is the largest.

The preliminary operation performer 712 may generate position correction information about the first image that includes movement information of the lens 711 that has moved from the in-focus position to the correction position.

According to an embodiment, the preliminary operation performer 712 may detect the correction position based on a difference between a maximum value and a minimum value among the first pixel values. According to another embodiment, the preliminary operation performer 712 may detect the correction position based on pixel values of pixels located in a diagonal direction among the first pixel values.

At step S1230, the preliminary operation performer 712 may detect the movement information of the lens 711 that has moved from the in-focus position to the correction position. According to another embodiment, the position correction information may include information about movement distance and direction of the lens 711 that has moved from the in-focus position to the correction position.

Figure 13:
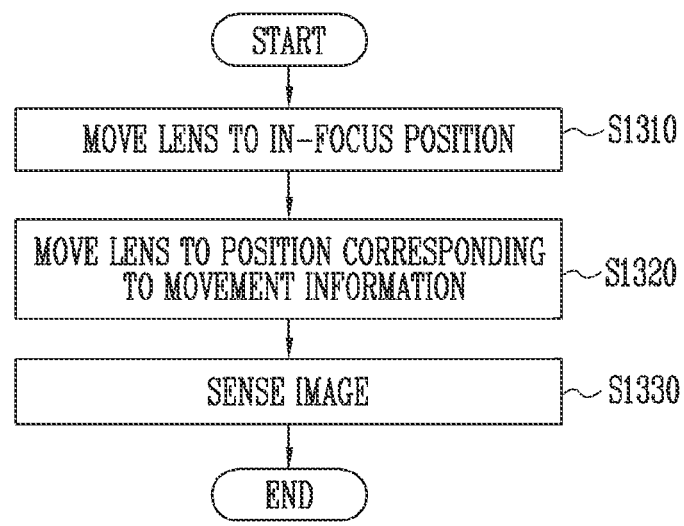
FIG. 13 is a flowchart illustrating an example method of changing a position of a lens according to an embodiment of the present disclosure.

FIG. 13 is a flowchart illustrating an example method of changing a position of a lens according to an embodiment of the present disclosure.

Referring to FIG. 13, the lens position controller 713 may change the position of the lens 711 from an in-focus position during an image sensing operation.

At step S1310, the lens position controller 713 may move the lens 711 to the in-focus position. The lens position controller 713 may move the position of the lens 711 to the in-focus position where pixels have the same phase by using pixel values obtained by sensing an image.

At step S1320, the lens position controller 713 may move the lens 711 from the in-focus position with respect to the captured image to a position corresponding to movement information. The lens position controller 713 may change the position of the lens 711 on the basis of the position correction information with respect to the test image during an operation of sensing the image.

For example, the position of the lens 711 may be changed during the image sensing operation as much as the correction position is changed from the in-focus position by sensing the test image.

At step S1330, the image sensor 710 may perform the image sensing operation. The difference between the pixel values obtained by performing the image sensing operation may be largest.

Figure 14:
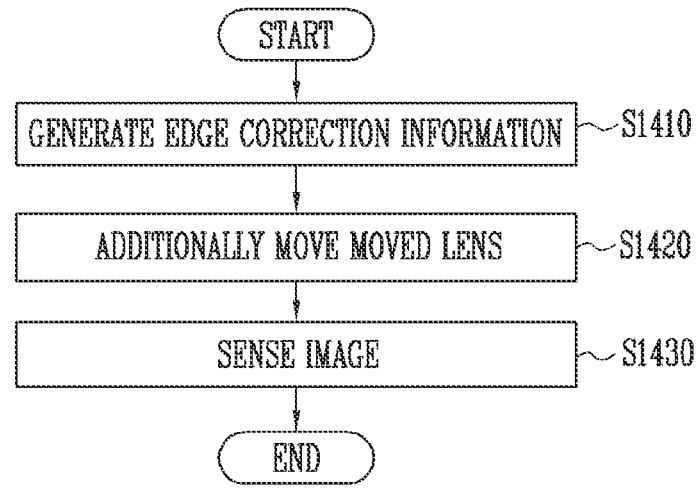
FIG. 14 is a flowchart illustrating an example method of additionally changing a position of a lens according to an embodiment of the present disclosure.

FIG. 14 is a flowchart illustrating an example method of additionally changing a position of a lens according to an embodiment of the present disclosure.

Referring to FIG. 14, the lens position controller 713 may additionally control a position of the lens 711 during an image sensing operation.

At step S1410, a preliminary operation performer 712 may generate edge correction information on the basis of pixel values corresponding to a second micro-lens, which may be located at an edge of a test image, among a plurality of micro-lenses.

Since the lens 711 may have a circular shape, the lens 711 may be moved more based on position correction information corresponding to the edge of the image in comparison with position correction information corresponding to a center of the image. When the image sensing operation is performed based on the position correction information corresponding to the center of the image, a pixel value difference between the pixels at the edge of the image may not be the largest.

At step S1420, the lens position controller 713 may additionally move the lens 711, which has moved to a position corresponding to movement information, on the basis of the edge correction information.

According to an embodiment, the preliminary operation performer 712 may generate the edge correction information, which is the position correction information corresponding to the edge of the test image. The lens position controller 713 may additionally move the position of the lens 711 to be changed based on the position correction information on the basis of the edge correction information.

According to another embodiment, the preliminary operation performer 712 may store position correction information corresponding to different micro-lenses in the storage device 714. The stored position correction information may correspond to the center of the test image and/or the edge of the test image. The preliminary operation performer 712 may change the position of the lens 711 from the in-focus position during the image sensing operation by using an average value of a plurality of stored pieces of position correction information.

At step S1430, the image sensor 710 may perform the image sensing operation. The position correction information corresponding to the edge of the test image and the position correction information corresponding to the center of the test image may be different from each other. The lens position controller 713 may additionally change the position of the lens 711 during the image sensing operation on the basis of the difference between position correction information for the center and the edge of the test image.

Figure 15:
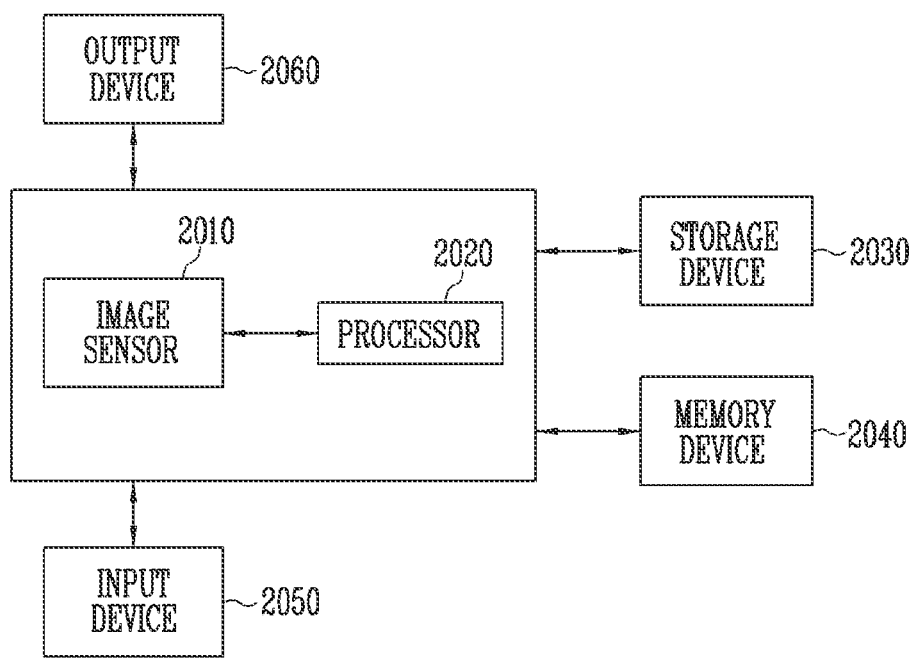
FIG. 15 is a block diagram illustrating an example electronic device including an image sensor according to an embodiment of the present disclosure.

FIG. 15 is a block diagram illustrating an example electronic device 2000 including an image sensor 2010 according to an embodiment of the present disclosure.

Referring to FIG. 15, the electronic device 2000 includes the image sensor 2010, a processor 2020, a storage device 2030, a memory device 2040, an input device 2050, and an output device 2060. Although not shown in FIG. 15, the electronic device 2000 may further include ports that are capable of communicating with a video card, a sound card, a memory card, a USB device, or the like, or with other electronic devices.

The image sensor 2010 may generate image data corresponding to incident light. The output device 2060 may display the image data. The storage device 2030 may store the image data. The processor 2020 may control operations of at least the image sensor 2010, the output device 2060, and the storage device 2030.

The processor 2020 may execute instructions to perform certain calculations or tasks. According to an embodiment of the present disclosure, the processor 2020 may be a microprocessor, a central processing unit (CPU), a controller, etc. The processor 2020 may communicate with the storage device 2030, the memory device 2040, and the input device 2050 through an address bus, a control bus, and/or a data bus to perform communication. According to an embodiment of the present disclosure, the processor 2020 may also be connected to an expansion bus such as a peripheral component interconnect (PCI) bus.

The storage device 2030 may be a non-volatile memory device such as, for example, a flash memory device, a solid state drive (SSD), a hard disk drive (HDD), a CD-ROM, etc.

The memory device 2040 may store data necessary for operation of the electronic device 2000. For example, the memory device 2040 may include a volatile memory device such as, for example, a dynamic random access memory (DRAM), a static random access memory (SRAM), etc., a nonvolatile memory device such as, for example, an erasable programmable read-only memory (EPROM), an electrically erasable programmable read-only memory (EEPROM), a flash memory device, etc.

The input device 2050 may include input means such as, for example, a keyboard, a keypad, a mouse, etc. The output device 2060 may include output means such as, for example, a printer, a display, etc.

The image sensor 2010 may be connected to the processor 2020 through buses or other communication links.

The image sensor 2010 may be implemented in various types of packages. For example, at least some configurations of the image sensor 2010 may be implemented using packages such as a package on package (POP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), wafer-level processed stack package (WSP), and the like.

According to an embodiment, the image sensor 2010 may be integrated together with the processor 2020 in one chip, or the image sensor 2010 and the processor 2020 may be different chips.

The electronic device 2000 may be, for example, a computing system using the image sensor 2010. For example, the electronic device 2000 may be a digital camera, a mobile phone, a personal digital assistant (PDA), a portable multimedia player (PMP), a smart phone, and the like.

According to an embodiment, the image sensor 2010 may perform a preliminary operation to generate position correction information and may control a position of the lens of the image sensor 2010 during an image sensing operation. Accordingly, the processor 2020 may generate a clear, high-resolution image based on the sensed image. The storage device 2030 may store the generated high-resolution image, and the output device 2060 may output the high-resolution image through the output means such as a printer or a display.

According to the present disclosure, an example image processing system is described that obtains a restorable image with high resolution by moving a lens to a position where a phase difference between pixels is the largest.

Various example embodiments are described in this disclosure for illustrative and descriptive purposes. However, the disclosure is not limited to the example embodiments. Rather, it will be apparent to those skilled in the art that many other embodiments are possible in light of the present disclosure.

What is claimed is:

1. An image sensor, comprising:
a lens configured to receive light;
a preliminary operation performer configured to generate position correction information based on a difference between first pixel values, the first pixel values corresponding to pixels of a first micro-lens, for the light of a first image received through the lens; and
a lens position controller configured to change a position of the lens for a second image on the basis of the position correction information,
wherein the preliminary operation performer detects an in-focus position corresponding to the position of the lens where the first pixel values for the first image have a same value, and a correction position corresponding to the position of the lens with the largest difference between the first pixel values for the first image.

2. The image sensor of claim 1, wherein the first micro-lens is one of a plurality of micro-lenses in the image sensor, and
the first micro-lens comprises adjacent pixels configured to detect a same color.

3. The image sensor of claim 1, wherein the preliminary operation performer is configured to detect the correction position on the basis of a difference between a maximum value and a minimum value among the first pixel values.

4. The image sensor of claim 1, wherein the preliminary operation performer is configured to detect the correction position on the basis of pixel values of pixels located in a diagonal direction.

5. The image sensor of claim 1, wherein the preliminary operation performer is configured to generate the position correction information for the first image that includes movement information of the lens from the in-focus position to the correction position.

6. The image sensor of claim 5, wherein the lens position controller is configured to move the lens from an in-focus position of the second image to the correction position on the basis of the movement information.

7. The image sensor of claim 6, wherein the preliminary operation performer is configured to generate position correction information comprising edge correction information on the basis of second pixel values corresponding to a second micro-lens located at an edge of the first image,
the second micro-lens comprises adjacent pixels configured to detect a same color, and
the lens position controller is configured to move the lens on the basis of the position correction information.

8. An image processing system comprising:
a lens configured to receive light and transmit the received light to a plurality of micro-lenses included in an image sensor,
wherein the image sensor is configured to: generate position correction information about a test image received through the lens according to a phase difference between pixels corresponding to a first micro-lens among the plurality of micro-lenses, and control a position of the lens for a captured image on the basis of the position correction information; and
an image processor configured to perform a resolution restoration operation on the basis of pixel values for the captured image and output a high-resolution image with restored resolution, and
wherein the image sensor includes a preliminary operation performer configured to detect an in-focus position corresponding to a position of the lens where phases of the pixels with respect to the test image have a same value, and a correction position corresponding to the position of the lens where a difference of the phases between the pixels with respect to the test image is the largest.

9. The image processing system of claim 8, wherein the first micro-lens comprises adjacent pixels that are configured to detect a same color.

10. The image processing system of claim 9, wherein the preliminary operation performer is configured to generate the position correction information with respect to the test image including movement information of the lens from the in-focus position to the correction position, and the image sensor includes a lens position controller configured to move the lens from the in-focus position of the captured image to the correction position corresponding to the movement information on the basis of the position correction information for the test image.

11. The image processing system of claim 10, wherein the preliminary operation performer is configured to generate edge correction information on the basis of phase values of pixels corresponding to a second micro-lens located at an edge of the test image among the plurality of micro-lenses, and the lens position controller is configured to move the lens on the basis of the edge correction information.

12. A method of operating an image processing system, the method comprising:

sensing a test image while performing a lens sweep of a lens;

generating position correction information for the test image based on a difference between first pixel values corresponding to pixels of a first micro-lens in an image sensor; and changing a position of the lens based on the position correction information, wherein generating the position correction information comprises detecting an in-focus position corresponding to the position of the lens where the first pixel values have a same value, the first micro-lens comprising adjacent pixels having a same color, and a correction position corresponding to the position of the lens with the largest difference between the first pixel values.

13. The method of claim 12, wherein the position correction information comprises movement information of the lens from the in-focus position to the correction position.

14. The method of claim 13, wherein changing the position of the lens comprises:

moving the lens to an in-focus position with respect to a captured image; and moving the lens from the in-focus position of the captured image to a position corresponding to the movement information.

15. The method of claim 14, wherein generating the position correction information comprises generating edge correction information on the basis of second pixel values corresponding to a second micro-lens located at an edge of the test image, and changing the position of the lens comprises additionally moving the lens to the position corresponding to the movement information based on the edge correction information.

16. The method of claim 14, comprising:

performing a resolution restoration operation on the basis of pixel values of the captured image; and outputting a high-resolution image with restored resolution.

17. A method of operating an imaging processing system, the method comprising:

sensing a test image while performing a lens sweep of a lens;

detecting an in-focus position where first pixels corresponding to a first micro-lens in an image sensor have a same phase, and a correction position where a phase difference between the first pixels is the largest;

generating position correction information for the test image including information about movement distance and direction of the lens movement from the in-focus position to the correction position;

changing the position of the lens to a position corresponding to the position correction information; and generating pixel values of a captured image through the lens whose position has been changed.

18. The method of claim 17, comprising:

performing a resolution restoration operation on the basis of pixel values of the captured image; and outputting a high-resolution image with restored resolution.

* * * * *